United States Patent [19]

Stepaniuk et al.

[11] Patent Number: 4,908,270
[45] Date of Patent: Mar. 13, 1990

[54] CONTINUOUS PREPARATION OF NITROSYL FLUORIDE

[75] Inventors: Nickolas J. Stepaniuk, Chesterfield; Bruce J. Lamb, St. Charles, both of Mo.

[73] Assignee: Mallinckrodt, Inc., St. Louis, Mo.

[21] Appl. No.: 316,024

[22] Filed: Feb. 27, 1989

[51] Int. Cl.[4] ............................................ C01B 21/084
[52] U.S. Cl. .................................................... 423/386
[58] Field of Search ......................................... 423/386

[56] References Cited

U.S. PATENT DOCUMENTS

| | | | |
|---|---|---|---|
| 2,366,518 | 1/1945 | Grebe et al. | 423/386 |
| 3,032,400 | 5/1962 | Marsh | 423/386 |
| 3,043,662 | 7/1962 | Lipscomb . | |
| 3,085,862 | 4/1963 | Atadan et al. | 423/386 |
| 3,110,558 | 11/1963 | Markowitz et al. . | |
| 3,185,541 | 5/1965 | Anello et al. . | |
| 3,185,542 | 5/1965 | Yodis | 423/286 |
| 3,290,115 | 12/1966 | Smai et al. | 423/386 |
| 3,336,110 | 8/1967 | Yoshikazuito et al. | 423/386 |
| 3,481,704 | 12/1969 | Van Der Plas | 423/386 |
| 3,660,030 | 5/1972 | Golebourne et al. | 403/386 |
| 4,536,252 | 8/1985 | McDonald et al. . | |

FOREIGN PATENT DOCUMENTS

| 749246 | 10/1970 | Belgium | 423/386 |
|---|---|---|---|
| 192181 | 11/1967 | U.S.S.R. | 423/386 |

Primary Examiner—Gary P. Straub
Assistant Examiner—Wayne A. Langel
Attorney, Agent, or Firm—Bernard, Rothwell & Brown

[57] ABSTRACT

A process and apparatus for the continuous production of nitrosyl fluoride from nitrite and hydrogen fluoride. Nitrite solids and hydrogen fluoride are separately introduced and blended into nitrosyl fluoride so as to form a reaction mixture within which the nitrite and the hydrogen fluoride react to produce additional nitrosyl fluoride. The hydrogen fluoride is introduced into the reaction mixture spaced away from where the nitrite is introduced into the reaction mixture so that the hydrogen fluoride and the nitrite separately mix into the nitrosyl fluoride and are diluted therein before mixing with each other, thereby avoiding a violent reaction between the hydrogen fluoride and the nitrite.

18 Claims, 2 Drawing Sheets

CONTINUOUS PREPARATION OF NITROSYL FLUORIDE

This invention relates to the preparation of nitrosyl fluoride, which has utility in diazotization reactions.

BACKGROUND OF THE INVENTION

Various methods have been used to form nitrosyl fluoride (NOF). One known method is to add a nitrite directly to an amine solution in hydrogen fluoride (HF). The direct addition of the nitrite to the HF solution of amine triggers a highly exothermic reaction which involves the formation of an unstable intermediate diazonium salt. Such salts are prone to decompose in a runaway reaction, producing safety hazards.

Attempts have also been made at producing NOF as a separate solution. The proposed processes have not proven satisfactory, as they generally fail to implement specific design provisions to deal with yield and operational problems, and typically, have been performed as a batch procedure. The batch makeup of NOF in HF is very exothermic. Local hotspots often account for yield losses of 3% or more, and as the volatile nitrite becomes a concentrated solution, the conversion by-products can contribute to high corrosion rates of the equipment used in the reaction.

When NOF solution is produced by a batch method, the addition of nitrite solids to anhydrous HF can generate a substantial amount of HF vapor. This HF vapor alters the material balance of the components and makes further processing difficult. Thus, vapor loss control equipment is needed under these circumstances to capture the HF released and prevent alteration of the material balance.

Batch processes for the production of NOF proceed by the incremental addition of nitrite to HF. Thus, there is no steady-state reaction mixture with the result that the reaction environment is continuously varying. In turn, this produces safety and containment engineering problems, the solutions of which have proven difficult and expensive.

Therefore a need exists for an alternative method of producing NOF which is safer to use, permits higher yields, improves process control, and reduces by-product corrosivity problems.

DETAILED DESCRIPTION OF THE PREFERRED EMBODIMENTS

Figure 1:
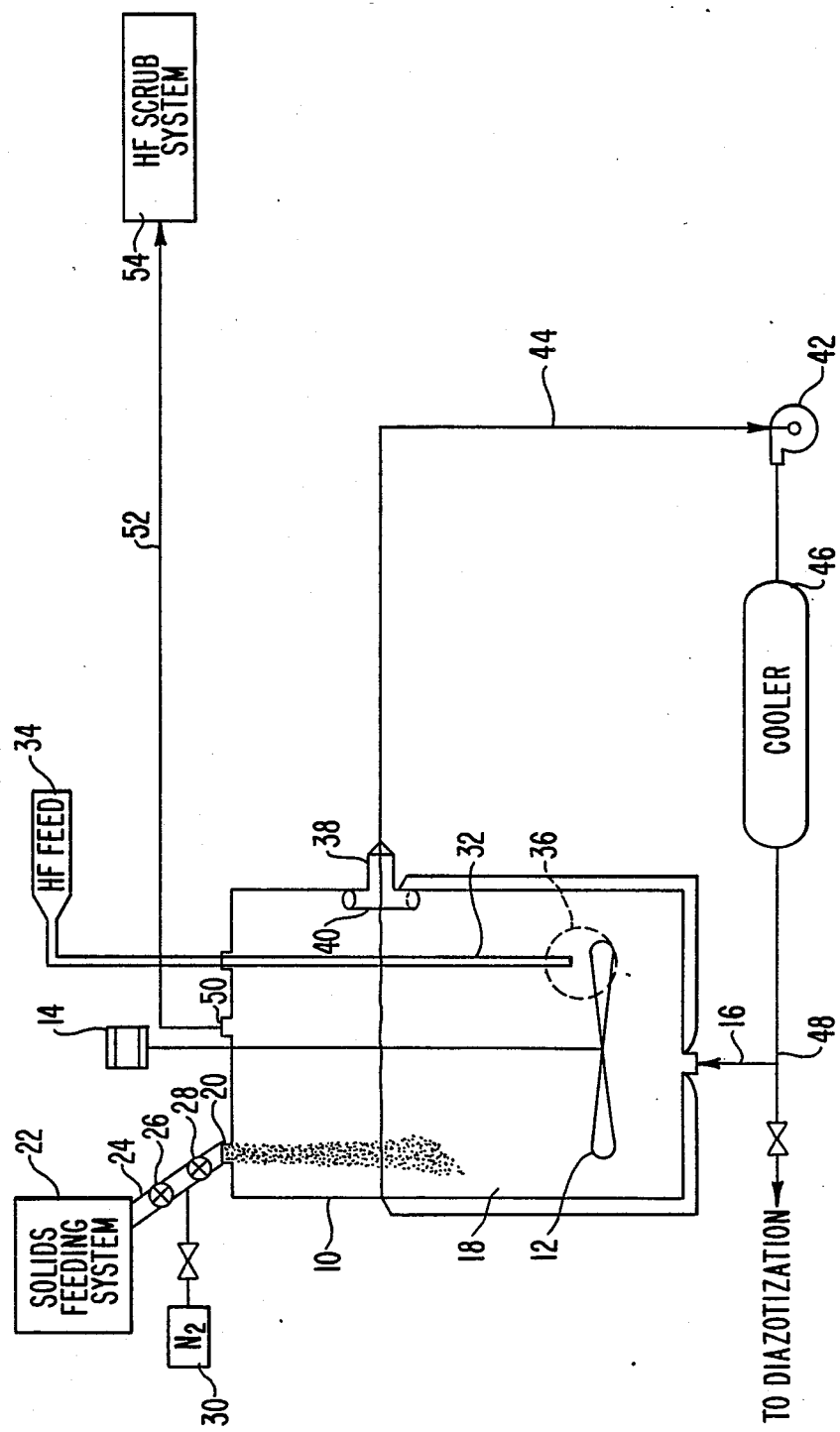
FIG. 1 is a schematic illustration of a single reactor embodiment for the continuous production of nitrosyl fluoride.

With reference to FIG. 1, a reactor 10 is provided, within which a reaction mixture is formed for the production of nitrosyl fluoride. In the embodiment shown, reactor 10 is a continuous stirred tank reactor having a stirring means 12 operated by a motor 14.

According to this embodiment, nitrosyl fluoride (NOF) solution is introduced into the bottom of reactor 10 through feed line 16. In order to form additional nitrosyl fluoride, hydrogen fluoride (HF) and nitrite are separately introduced into reactor 10 and separately mixed into the nitrosyl fluoride present in reactor 10 to form reaction mixture 18. Thus, the hydrogen fluoride and nitrite are diluted in the reaction mixture before mixing with each other so as to avoid a violent reaction between the hydrogen fluoride and the nitrite.

In the embodiment shown in FIG. 1, nitrite, such as sodium nitrite or potassium nitrite, in the form of pellets or granules, is fed into the top of the reactor through inlet 20. In the illustrated embodiments, the source of the nitrite is a solids feeding system 22 having a dual-valve feeder 24, including valves 26 and 28, and a source of nitrogen gas 30 for nitrogen-purging of the nitrite.

Hydrogen fluoride (preferably anhydrous HF) is introduced into reaction mixture 18 via a dip-pipe subsurface feed input 32 from an HF source 34. The area designated 36 in FIG. 1 is a local HF mixing zone wherein, for example, a radial turbine is utilized to mix HF into the solution. By spacing the sources of nitrite and hydrogen fluoride apart, the reactants are allowed to mix into the bulk phase before they encounter each other, so that the hydrogen fluoride and nitrite do not react violently during the formation of nitrosyl fluoride.

Nitrite and hydrogen fluoride can be continuously added to the reaction mixture 18 in reactor 10, or cyclically added over a cycle time sufficiently short so as not to vary substantially the bulk composition.

Nitrosyl fluoride exits the reactor through outlet 38. Outlet 38 of tank 10 is an overflow-type outlet, whereby solution flows out of tank 10 at the same rate that material is introduced therein, so that the reaction mixture 18 is maintained at a constant volume. Advantageously, a baffle 40 is provided over outlet 38 to force the upflow of solution as it exits the reactor, thereby allowing coarse solids to settle out and remain in the reactor. A pump 42 is provided along line 44 to pump the solution through a cooler 46. Cooler 46 can use any suitable cooling means, such as a shell and tube system with a refrigerated water supply and return. The cooled solution of nitrosyl fluoride is split at 48, with a small portion thereof going to diazotization, and the bulk of the nitrosyl fluoride being returned to reactor 10 via line 16. Escaping hydrogen fluoride vapor is removed from the top of reactor 10 through vent 50, and passed through line 52 to a hydrogen fluoride scrub system 54.

Figure 2:
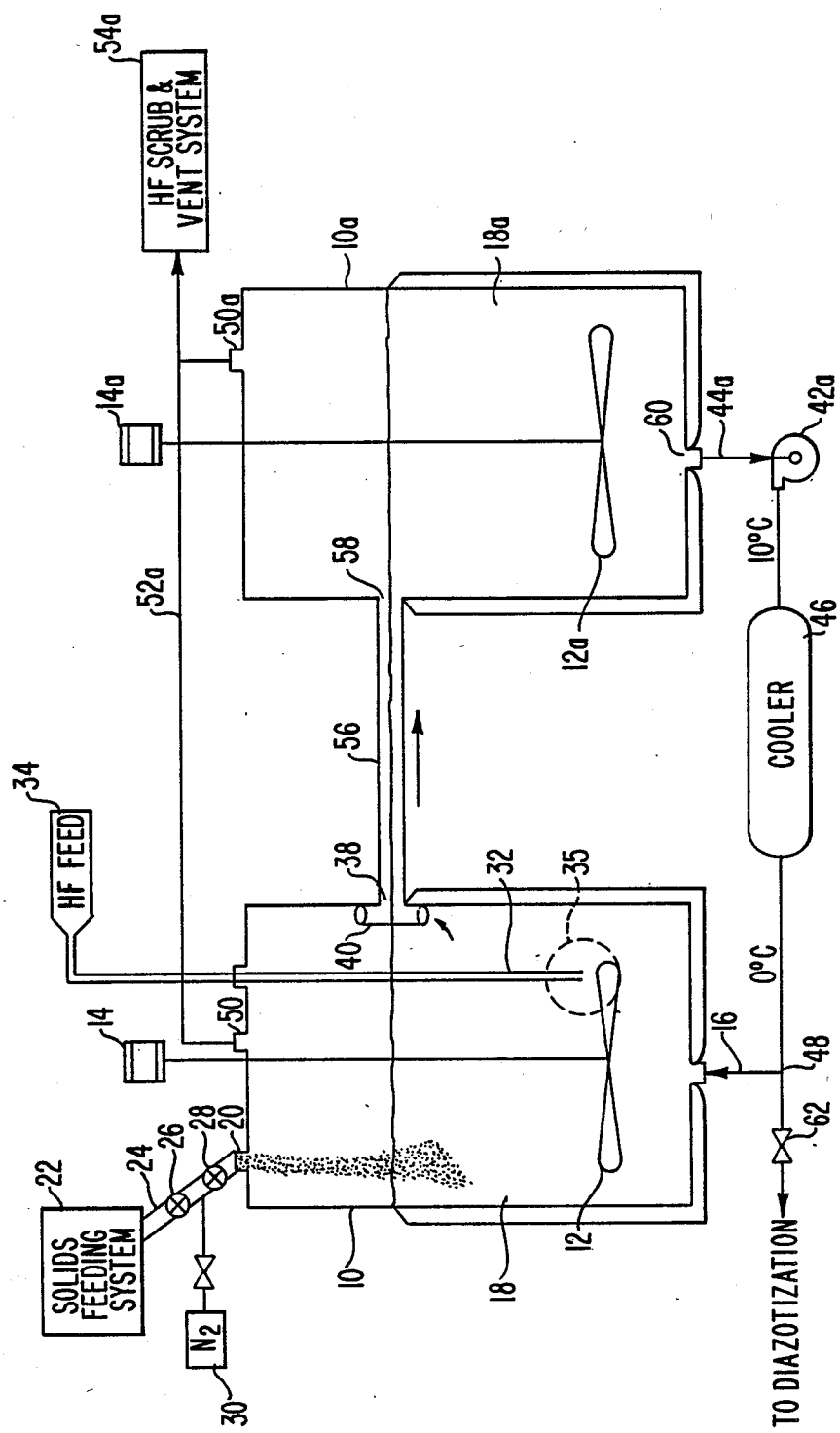
FIG. 2 is a schematic illustration of a dual reactor embodiment for the continuous preparation of nitrosyl fluoride.

FIG. 2 illustrates a preferred dual reactor system for the continuous production of nitrosyl fluoride, wherein features having the same function as those shown in FIG. 1 are given the same reference numeral in FIG. 2. In the embodiment shown in FIG. 2, a second reactor 10a is provided which also advantageously is a continuous stirred tank reactor having a stirring means 12a operated by a motor 14a associated therewith. According to this embodiment, a line 56 connects the outlet of reactor 10 with an inlet 58 of reactor 10a into which the reaction mixture 18a passes. The nitrosyl fluoride exits reactor 10a through an outlet 60 in the bottom of reactor 10a and is pumped through line 44a by pump 42a into cooler 46. The nitrosyl fluoride then is split at 48, with the bulk of it being returned to reactor tank 10 to be mixed with additional nitrite and hydrogen fluoride.

In both the illustrated embodiments, a constant volume reservoir of reaction mixture is provided in a first reactor, which reservoir is of a sufficient volume to dampen out flow effects from an external cooling loop. Additionally, the reservoir volume is sufficient to keep the two reactant input streams separated from each other, such that each reactant is mixed into the bulk phase prior to encountering the other reactant. Simultaneously with the introduction of nitrite into the reservoir, a second input reactant stream of hydrogen fluoride also is introduced. This input stream is physically separated from the nitrite stream, thereby allowing both reactants to be mixed into the bulk phase NOF prior to encountering each other.

As the reactants are introduced into the first reactor, a reaction mixture is formed and nitrosyl fluoride solution begins to be produced. This nitrosyl fluoride solution can be recovered from the first reactor without further processing. If that is to occur, the solution is removed, preferably by an overflow means, cooled, and passed to diazotization reaction vessels. In preferred embodiments, only a portion of the NOF solution will be passed through to diazotization, with the remainder being fed back into the constant volume reservoir of reactor 10. This has the effect of maintaining the reservoir volume constant as well as controlling the temperature within the reactor, and additionally controlling the NOF concentration at a substantially constant value.

In the two reaction vessel system, the NOF produced in the first reactor is transferred to a second reactor which is similar to the first reactor. For this system, the second reactor only needs a single feed introduction point for receiving the reaction mixture from the first reactor. Generally, overflow means connecting the two reactors is a sufficient method of transfer. However, other transfer means including active means, can be used.

The second reactor will have at least one discharge means for removing NOF solution after a further dissolution reaction has occurred. The second reactor functions as a pass-through vessel for facilitating further reaction. Performance of the system is enhanced over a single stage reactor with respect to solids retention and dissolution. As noted above, the discharge means in the second reactor is advantageously located at the bottom thereof. NOF solution is withdrawn and pumped through a cooler back into the first reactor. External cooling allows the heat of reaction to be removed from the reactor vessels, thereby reducing local hot spots. Most desirably, the returning NOF is fed into a feed introduction point located at the bottom of the first reactor. This enhances mixing and sweeps undissolved solids off the reactor bottom, thereby avoiding risks of hazardous accumulations.

Subsequently to cooling, but prior to being returned to the first reactor, the NOF solution can be split into separate streams with a portion being recovered. This recovered portion can be passed through a filter, which traps any residual solid nitrite particles and allows them to dissolve. Such filtering protects the flow control valves used in the downstream diazotization. If desired, more than two reactors can be used in the process, and such a configuration is encompassed within the scope of the present invention.

Utilizing the described process results in a much slower energy release during the desired reaction and greatly reduces both vapor flash and local heat-up. The dissolution rate of the added nitrite is sufficiently slowed by the present method to allow the heat of reaction to be gently dissipated into the solution with minimal local effects. Thus, improved yields over prior art processes can be expected.

The present process improves material balance, by the suppression of NOF decomposition and HF flashing from local overheating, allowing improved control of the composition of the NOF solution. The need for repeated assessment of the composition of NOF from each batch, which is required by the prior art, is reduced if not eliminated. Overcharges of NOF into the diazotization process are effectively eliminated, thus assuring high NOF conversion during diazotization. Undesirable tarlike by-products found in subsequent reaction steps when excess NOF in diazonium is used are substantially reduced over known processes.

The enhanced compositional control of the present process also substantially eliminates the formation of corrosive by-products produced by prior art processes. In turn, this allows the identification and use of a particularly desirable construction material for a given narrow operating environment. Of course, this construction material will vary depending upon the operating environment selected, but the composition of choice easily can be determined by those of ordinary skill in the art of chemical engineering.

The continuous NOF make-up process is much safer than the prior art processes. Nitrite is added to a full or a nearly full strength NOF solution. This greatly reduces the energy release rate upon reaction. The reaction is spread throughout the reaction volume, thereby avoiding severe local hotspots and flashing. When simultaneous addition of anhydrous HF is performed using a dip-pipe sub-surface inlet, the simultaneous sub-surface addition thereof helps the two feeds to independently mix with the NOF prior to contacting each other. It also encourages cross-flow of the lighter HF and the heavier nitrite feeds in the constant volume. Therefore, there is little or no risk of the violent reaction which is seen with the addition of nitrite solids to anhydrous HF in the prior art.

The invention will be further described in reference to the following example, which is not intended to be limiting.

EXAMPLE I

This example utilizes a dual reactor system as schematically shown in FIG. 2. The primary dissolver reactor 10 has a working volume of approximately 50 gallons. Nitrosyl fluoride solution is fed into primary reactor 10 via line 16 at a temperature of approximately 0° C. and at a rate of about 8.5 gallons per minute (gpm). Reactants sodium nitrite ($NaNO_2$) and hydrogen fluoride are fed into the reaction mixture at a mole ratio of approximately 12 moles HF/1 mole $NaNO_2$. Although pellets of $NaNO_2$ can be used (with a minimum residence time within reactor 10 of about 3 minutes), sodium nitrite granules are preferred. The minimum residence time when using sodium nitrite granules is about 1 minute, with preferred residence times of about 6–10 minutes. Hydrogen fluoride is fed into reactor 10 at a rate of about 155 lb/hr (7.8 lb mol/hr), and sodium nitrite is fed into the reaction mixture at a rate of about 44 lb/hr (0.65 lb mol/hr). At an NOF feed rate into reactor 10 of 8.5 gpm, the above-described reaction mixture has a residence time within reactor 10 of about 6 minutes.

The reaction mixture exits outlet 38 of tank 10 at a rate of about 8.7 gpm and flows into the fines dissolver reactor 10a which has a working volume of about 50 gallons. The materials continued to react within reactor 10a to form nitrosyl fluoride, which is withdrawn from reactor 10a at outlet 60 at the bottom thereof. Nitrosyl fluoride solution exiting tank 10a is at a temperature of about 10° C., and is drawn through line 44a by pump 42a through a shell and tube-type cooler 46 having a refrigerated water supply and return. Cooler 46 cools the nitrosyl fluoride solution to about 0° C. before the solution is passed by a flow-splitter 48. A flow-control valve 62 allows about 16.8 gph of the nitrosyl fluoride solution to pass to diazotization, while recycling about 97% of the solution to the reaction mixture 18 in reactor tank 10. In reactor 10, the temperature of the reaction mixture increases to about 10° C. due to heat produced by the reaction of hydrogen fluoride and nitrite in the production of nitrosyl fluoride.

Example II

This example utilizes a dual reactor system as schematically shown in FIG. 2. The primary dissolver reactor 10 has a working volume of approximately 195 gallons. Nitrosyl fluoride solution is fed into primary reactor 10 via line 16 at a temperature of approximately 0° C. and at a rate of about 33 gallons per minute (gpm). Reactants sodium nitrite ($NaNO_2$) and hydrogen fluoride are fed into the reaction mixture at a mole ratio of approximately 12 moles HF/1 mole $NaNO_2$. Although pellets of $NaNO_2$ can be used (with a minimum residence time within reactor 10 of about 3 minutes), sodium nitrite granules are preferred. The minimum residence time when using sodium nitrite granules is about 1 minute, with preferred residence times of about 6–10 minutes. Hydrogen fluoride is fed into reactor 10 at a rate of about 605.5 lb/hr (30.25 lb mol/hr), and sodium nitrite is fed into the reaction mixture at a rate of about 174 lb/hr (2.52 lb mol/hr). At an NOF feed rate into reactor 10 of 33 gpm, the above-described reaction mixture has a residence time within reactor 10 of about 6 minutes.

The reaction mixture exits outlet 38 of tank 10 at a rate of about 34 gpm and flows into the fines dissolver reactor 10a which has a working volume of about 195 gallons. The materials continued to react within reactor 10a to form nitrosyl fluoride, which is withdrawn from reactor 10a at outlet 60 at the bottom thereof. Nitrosyl fluoride solution exiting tank 10a is at a temperature of about 10° C., and is drawn through line 44a by pump 42a through a shell and tube-type cooler 46 having a refrigerated water supply and return. Cooler 46 cools the nitrosyl fluoride solution to about 0° C. before the solution is passed by a flow-splitter 48. A flow-control valve 62 allows about 1.1 gpm of the nitrosyl fluoride solution to pass to diazotization, while recycling about 97% of the solution to the reaction mixture 18 in reactor tank 10. In reactor 10, the temperature of the reaction mixture increases to about 10° C. due to heat produced by the reaction of hydrogen fluoride and nitrite in the production of nitrosyl fluoride.

EXAMPLE III

This example utilizes a dual reactor system as schematically shown in FIG. 2. The primary dissolver reactor 10 has a working volume of approximately 390 gallons. Nitrosyl fluoride solution is fed into primary reactor 10 via line 16 at a temperature of approximately 0° C. and at a rate of about 66 gallons per minute (gpm). Reactants sodium nitrite ($NaNO_2$) and hydrogen fluoride are fed into the reaction mixture at a mole ratio of approximately 12 moles HF/1 mole $NaNO_2$. Although pellets of $NaNO_2$ can be used (with a minimum residence time within reactor 10 of about 3 minutes), sodium nitrite granules are preferred. The minimum residence time when using sodium nitrite granules is about 1 minute, with preferred residence times of about 6–10 minutes. Hydrogen fluoride is fed into reactor 10 at a rate of about 1211 lb/hr (60.5 lb mol/hr), and sodium nitrite is fed into the reaction mixture at a rate of about 348 lb/hr (5.04 lb mol/hr). At an NOF feed rate into reactor 10 of 66 gpm, the above-described reaction mixture has a residence time within reactor 10 of about 6 minutes.

The reaction mixture exits outlet 38 of tank 10 at a rate of about 68 gpm and flows into the fines dissolver reactor 10a, which has a working volume of about 390 gallons. The materials continued to react within reactor 10a to form nitrosyl fluoride, which is withdrawn from reactor 10a at outlet 60 at the bottom thereof. Nitrosyl fluoride solution exiting tank 10a is at a temperature of about 10° C., and is drawn through line 44a by pump 42a through a shell and tube-type cooler 46 having a refrigerated water supply and return. Cooler 46 cools the nitrosyl fluoride solution to about 0° C. before the solution is passed by a flow-splitter 48. A flow-control valve 62 allows about 2.2 gpm of the nitrosyl fluoride solution to pass to diazotization, while recycling about 97% of the solution to the reaction mixture 18 in reactor tank 10. In reactor 10, the temperature of the reaction mixture increases to about 10° C. due to heat produced by the reaction of hydrogen fluoride and nitrite in the production of nitrosyl fluoride.

EXAMPLE IV

This example utilizes a dual reactor system as schematically shown in FIG. 2. The primary dissolver reactor 10 has a working volume of approximately 780 gallons. Nitrosyl fluoride solution is fed into primary reactor 10 via line 16 at a temperature of approximately 0° C. and at a rate of about 132 gallons per minute (gpm). Reactants sodium nitrite ($NaNO_2$) and hydrogen fluoride are fed into the reaction mixture at a mole ratio of approximately 12 moles HF/1 mole $NaNO_2$. Although pellets of $NaNO_2$ can be used (with a minimum residence time within reactor 10 of about 3 minutes), sodium nitrite granules are preferred. The minimum residence time when using sodium nitrite granules is about 1 minute, with preferred residence times of about 6–10 minutes. Hydrogen fluoride is fed into reactor 10 at a rate of about 2422 lb/hr (121 lb mol/hr), and sodium nitrite is fed into the reaction mixture at a rate of about 696 lb/hr (10.08 lb mol/hr). At an NOF feed rate into reactor 10 of 132 gpm, the above-described reaction mixture has a residence time within reactor 10 of about 6 minutes.

The reaction mixture exits outlet 38 of tank 10 at a rate of about 136 gpm and flows into the fines dissolver reactor 10a which has a working volume of about 780 gallons. The materials continued to react within reactor 10a to form nitrosyl fluoride, which is withdrawn from reactor 10a at outlet 60 at the bottom thereof. Nitrosyl fluoride solution exiting tank 10a is at a temperature of about 10° C., and is drawn through line 44a by pump 42a through a shell and tube-type cooler 46 having a refrigerated water supply and return. Cooler 46 cools the nitrosyl fluoride solution to about 0° C. before the solution is passed by a flow-splitter 48. A flow-control valve 62 allows about 4.4 gpm of the nitrosyl fluoride solution to pass to diazotization, while recycling about 97% of the solution to the reaction mixture 18 in reactor tank 10. In reactor 10, the temperature of the reaction mixture increases to about 10° C. due to heat produced by the reaction of hydrogen fluoride and nitrite in the production of nitrosyl fluoride.

EXAMPLE V

This example utilizes a dual reactor system as schematically shown in FIG. 2. The primary dissolver reactor 10 has a working volume of approximately 1,560 gallons. Nitrosyl fluoride solution is fed into primary reactor 10 via line 16 at a temperature of approximately 0° C. and at a rate of about 264 gallons per minute (gpm). Reactants sodium nitrite ($NaNO_2$) and hydrogen fluoride are fed into the reaction mixture at a mole ratio of approximately 12 moles HF/1 mole $NaNO_2$. Although pellets of $NaNO_2$ can be used (with a minimum residence time within reactor 10 of about 3 minutes), sodium nitrite granules are preferred. The minimum residence time when using sodium nitrite granules is about 1 minute, with preferred residence times of about 6–10 minutes. Hydrogen fluoride is fed into reactor 10 at a rate of about 4844 lb/hr (242 lb mol/hr), and sodium nitrite is fed into the reaction mixture at a rate of about 1,392 lb/hr (20.16 lb mol/hr). At an NOF feed rate into reactor 10 of 264 gpm, the above-described reaction mixture has a residence time within reactor 10 of about 6 minutes.

The reaction mixture exits outlet 38 of tank 10 at a rate of about 272 gpm and flows into the fines dissolver reactor 10a which has a working volume of about 1824 gallons. The materials continued to react within reactor 10a to form nitrosyl fluoride, which is withdrawn from reactor 10a at outlet 60 at the bottom thereof. Nitrosyl fluoride solution exiting tank 10a is at a temperature of about 10° C., and is drawn through line 44a by pump 42a through a shell and tube-type cooler 46 having a refrigerated water supply and return. Cooler 46 cools the nitrosyl fluoride solution to about 0° C. before the solution is passed by a flow-splitter 48. A flow-control valve 62 allows about 8.8 gpm of the nitrosyl fluoride solution to pass to diazotization, while recycling about 97% of the solution to the reaction mixture 18 in reactor tank 10. In reactor 10, the temperature of the reaction mixture increases to about 10° C. due to heat produced by the reaction of hydrogen fluoride and nitrite in the production of nitrosyl fluoride.

Since many modifications, variations, and changes in detail may be made to the described embodiments, it is intended that all matter in the aforegoing description and shown in the accompanying drawings be interpreted as illustrative and not in a limiting sense.

Since many modifications, variations, and changes in detail may be made to the described embodiments, it is intended that all matter in the aforegoing description and shown in the accompanying drawings be interpreted as illustrative and not in a limiting sense.

What is claimed is:

1. A process for the preparation of nitrosyl fluoride, comprising separately introducing and blending nitrite and hydrogen fluoride into nitrosyl fluoride solution so as to form a reaction mixture within which the nitrite and the hydrogen fluoride react so as to produce additional nitrosyl fluoride, and removing nitrosyl fluoride produced in the reaction mixture, wherein the reaction mixture is maintained at a substantially constant volume during the introducing and removing steps, and wherein said hydrogen fluoride is introduced into said reaction mixture spaced away from where said nitrite is introduced into said reaction mixture so that the hydrogen fluoride and the nitrite independently mix into said nitrosyl fluoride solution and are diluted therein before mixing with each other, thereby avoiding a violent reaction between the hydrogen fluoride and the nitrite.

2. The process of claim 1 wherein said nitrite is continuously introduced into said reaction mixture.

3. The process of claim 1 wherein said hydrogen fluoride is continuously introduced into said reaction mixture.

4. The process of claim 1 wherein nitrite and hydrogen fluoride are continuously introduced into said reaction mixture spaced apart, and wherein nitrosyl fluoride is continuously introduced into one portion of the reaction mixture while nitrosyl fluoride formed in the reaction mixture is continuously removed from another portion of the reaction mixture.

5. The process of claim 1 wherein the hydrogen fluoride is cyclically introduced into said reaction mixture.

6. The process of claim 1 wherein said nitrite is cyclically introduced into said reaction mixture.

7. The process of claim wherein the nitrite and hydrogen fluoride are cyclically and simultaneously introduced into said reaction mixture spaced apart.

8. The process of claim 7 wherein nitrosyl fluoride is continuously introduced into one portion of the reaction mixture while nitrosyl fluoride formed in the reaction mixture is continuously removed from another portion of said reaction mixture.

9. A process for the continuous preparation of nitrosyl fluoride, comprising continuously and separately introducing and blending nitrite and hydrogen fluoride into nitrosyl fluoride solution so as to form a reaction mixture within which the nitrite and the hydrogen fluoride react to produce additional nitrosyl fluoride, and removing nitrosyl fluoride produced in the reaction mixture, wherein said hydrogen fluoride is introduced into said reaction mixture spaced away from where said nitrite is introduced into said reaction mixture so that the hydrogen fluoride and the nitrite independently mix into said nitrosyl fluoride and are diluted therein before mixing with each other, thereby avoiding a violent reaction between the hydrogen fluoride and the nitrite.

10. The process of claim 9 wherein nitrosyl fluoride is continuously introduced into one portion of the reaction mixture and nitrosyl fluoride is continuously removed from another portion of the reaction mixture.

11. The process of claim 9 wherein said reaction mixture is initially formed in a first reactor, further comprising transferring said reaction mixture to a second reactor to permit further reaction of said reaction mixture to occur in the second reactor.

12. The process of claim 9 further comprising

13. The process of claim 12 wherein said cooling is external to said reactor.

14. The process of claim 13, further comprising recycling at least a portion of said cooled solution back into said reactor.

15. The process of claim 11, further comprising returning at least a portion of said reaction mixture from said second reactor to said first rector to maintain a constant volume reservoir of reaction mixture in the first reactor.

16. The process of claim 15, further comprising cooling said returning portion of reaction mixture.

17. The process of claim 9, wherein said hydrogen fluoride is introduced by a dip-pipe sub-surface feed input.

18. The process of claim 16, wherein said returned portion is fed into said first reactor at the bottom of said reactor.

* * * * *

UNITED STATES PATENT AND TRADEMARK OFFICE
CERTIFICATE OF CORRECTION

PATENT NO. : 4,908,270

DATED : March 13, 1990

INVENTOR(S) : Nickolas J. STEPANIUK, et al.

It is certified that error appears in the above-identified patent and that said Letters Patent is hereby corrected as shown below:

Specification:

Column 7, lines 49-53, delete this paragraph in its entirety.

Claims:

Claim 12, line 49, after "comprising" insert --cooling said solution--.

Signed and Sealed this

Twelfth Day of November, 1991

Attest:

HARRY F. MANBECK, JR.

Attesting Officer    Commissioner of Patents and Trademarks